April 3, 1928.

E. J. VON PEIN 1,664,955

CASH REGISTER

Filed April 13, 1921     6 Sheets-Sheet 2

Inventor
Edw J. Von Pein
BY
Attorneys

April 3, 1928.  
E. J. VON PEIN  
1,664,955  
CASH REGISTER  
Filed April 13, 1921  
6 Sheets-Sheet 3
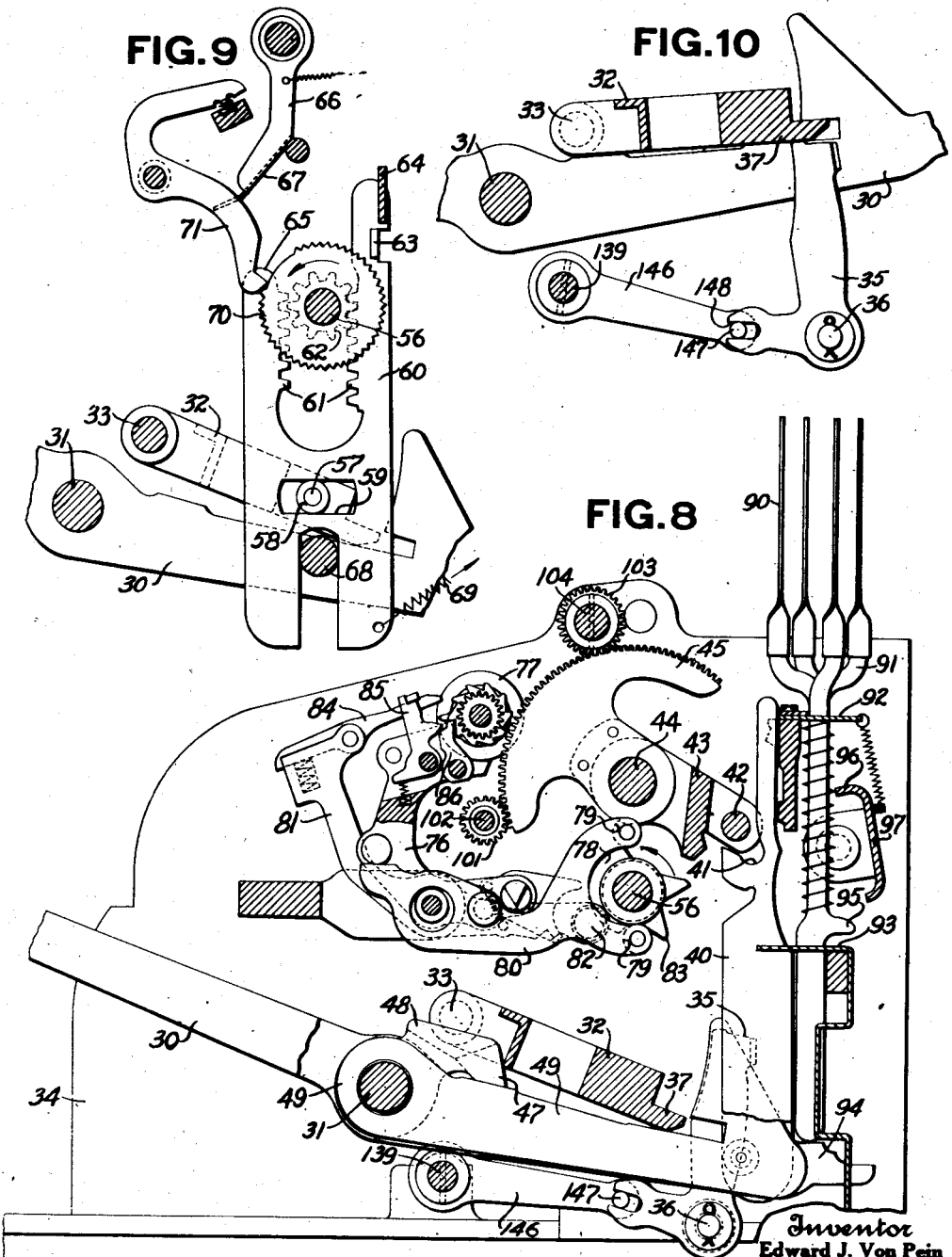
Inventor  
Edward J. Von Pein April 3, 1928.
E. J. VON PEIN
1,664,955
CASH REGISTER
Filed April 13, 1921    6 Sheets-Sheet 4
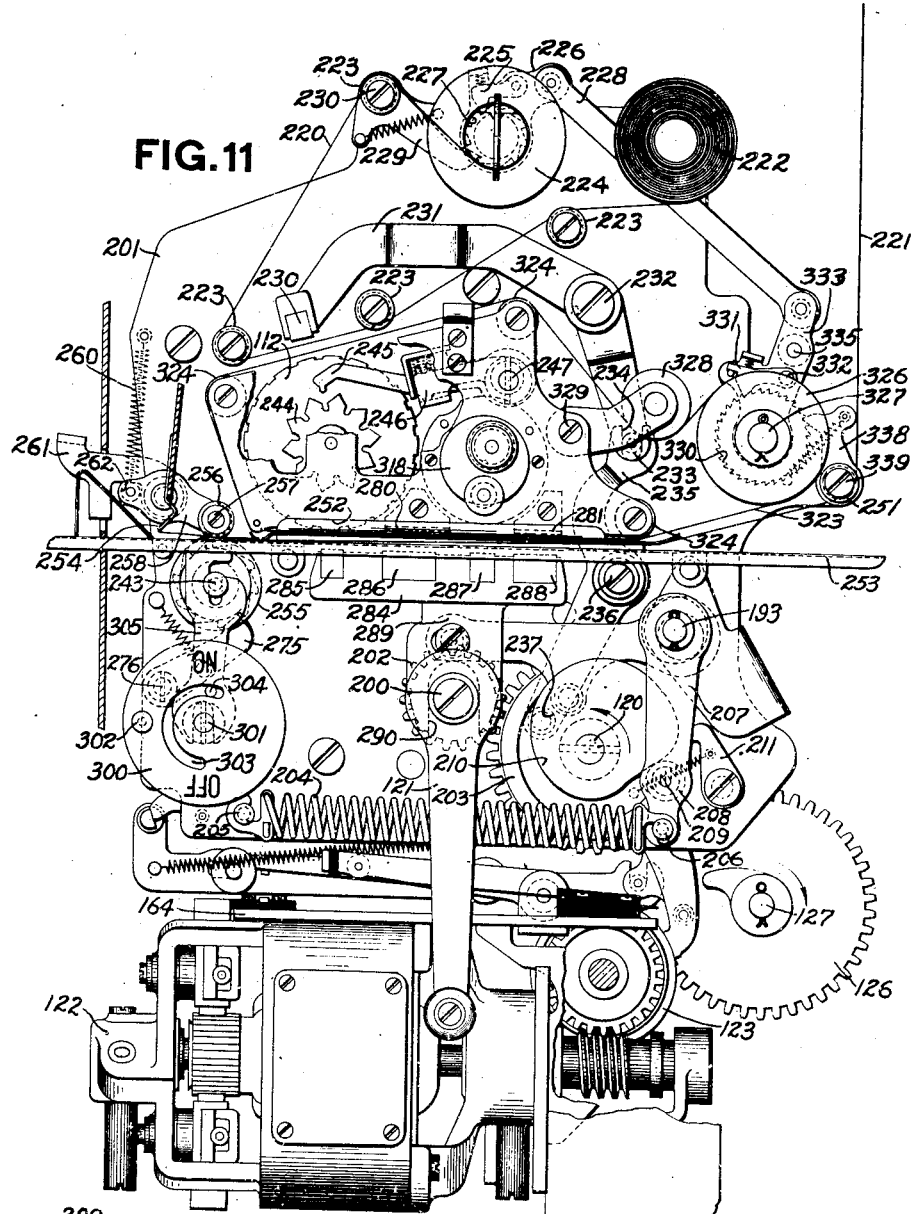
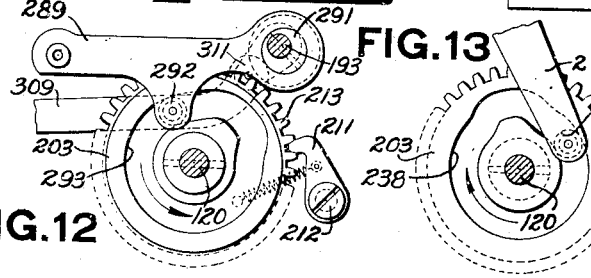
Inventor
Edward J. Von Pein
BY Earl Beust
Henry C. Stauffer
Attorneys April 3, 1928.

E. J. VON PEIN 1,664,955

CASH REGISTER

Filed April 13, 1921

Inventor
Edward J. Von Pein
BY
Attorneys

April 3, 1928.  E. J. VON PEIN  1,664,955
CASH REGISTER
Filed April 13, 1921   6 Sheets-Sheet 6

Inventor
Edward J. Von Pein
BY Carl Beust
Henry Stauffer
Attorneys

Patented Apr. 3, 1928.

1,664,955

UNITED STATES PATENT OFFICE.

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed April 13, 1921. Serial No. 460,882.

This invention relates to improvements in accounting machines, and has more particular relation to those which, in addition to making a record of transactions upon a totalizer, make an additional printed record of all transactions and indicate the same.

One object of the invention is to provide means for printing and issuing a receipt at each operation of the machine, containing the amount represented in the transaction together with the date, consecutive number of the transaction, and some suitable electro.

Another object of the invention is to provide means at will, for disabling the receipt printing and issuing mechanism.

Still another object of the invention is to provide power means under control of the item keys for automatically effecting an operation of the printing mechanism after the item keys have been depressed.

With these and incidental objects in view the invention consists in certain novel features of construction and combinations of parts, the essential elements of which are set forth in appended claims and a preferred form of embodiment of which is hereinafter described with reference to the drawings which accompany and form part of this specification.

Of said drawings:

Figs. 1$^A$ and 1$^B$ taken together constitute a plan view of the machine.

Fig. 8 is a transverse sectional view, with parts removed for clearness, taken on the line 8—8 of Fig. 1$^A$.

Fig. 9 is a detail view showing the means for rotating the main driving shaft.

Fig. 10 is a detail view showing the latch device retaining the key coupler in its raised position during the operation of the printer.

Fig. 11 is an elevational view of the printer and electric motor.

Fig. 12 is a detail view of the printer driving shaft gear, showing the receipt printer impression platen cam.

Fig. 13 is a detail view of the opposite side of the printer driving shaft gear showing the detail strip printer impression platen cam.

The invention is shown as carried out in connection with a machine of the general type shown in Letters Patent of the United States to Carney, No. 497,860 and No. 683,877, granted May 23, 1893 and October 1, 1901, respectively.

Described in general terms, the machine comprises a series of manipulative devices, such as item keys, which actuate mechanism for indicating the items, operate a totalizer, and set up type, and release means for printing on a record strip retained in the machine and on an issuing receipt, the amount entered at each operation of the item keys.

Figure 1A:
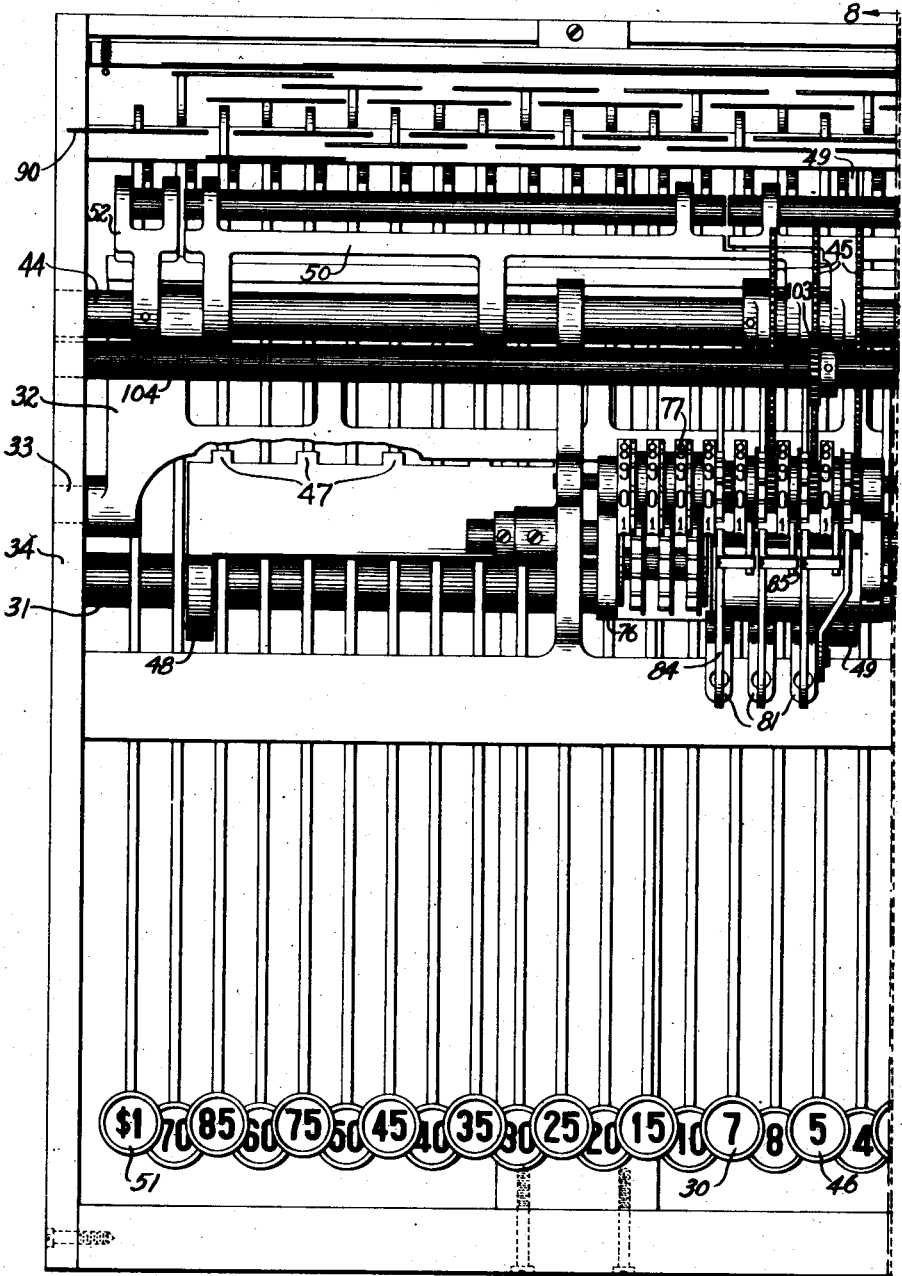

Keys 30 (Figs. 1$^A$, 1$^B$ and 8) pivoted upon a transverse rod 31, when depressed, engage and rock a key coupler 32 a sufficient distance to enable an arm 35 (Figs. 8 and 10), pivoted on a stud 36, to swing forward and under the rear edge 37 of the key coupler (Fig. 10) in which position the key coupler is retained until after the printing operation has been completed. The key coupler is provided with trunnions 33 having bearings in the side frames 34. Attached to the rear end of each key, except the five cent key, is an upright member 40 formed with a shoulder 41 adapted, when the key 30 is operated, to engage a transverse rod 42 of a rocking frame 43 pivoted on a transverse rod 44, to rock said frame a distance corresponding to the value of the operated key except in the case of keys for entering uneven multiples of five. There is a frame 43 for each denominational group of keys 30. Each frame has attached to it a registering segment 45 (Fig. 8).

The five cent key 46 (Fig. 1^A) and all uneven multiples of five, engage downwardly projecting lugs 47 on a pivoted frame 48, which has fast to it a rearwardly extending arm 49 (Figs. 8 and 1^A), carrying an upright member similar to the member 40 having its shoulder 41 located to rock the penny frame 43 a distance of five divisions, all of which is fully described in the Carney Patent No. 683,877 previously referred to. For example, should the seventy-five cent key be depressed the penny segment frame 43 would be rocked five divisions and the dime segment frame 50 would be moved seven divisions.

The dollar key 51 (Fig. 1^A) operates the segment frame 52 which is fast on the rod 44 to rock the dollar segment 45 which is also fast on this rod.

A main driving shaft 56 (Figs. 8 and 9) is given a revolution in a counter clockwise direction each time a key is operated. A stud 57 projecting from the right hand end of the key coupler carries a roller 58 which operates within an opening 59 in a rack plate 60 provided with two groups of rack teeth 61 which alternately mesh with a gear 62 fast to the shaft 56. As the plate 60 is moved upward by depressing a key, the rack 61, which is normally in engagement with the gear 62, will cause the shaft 56 to revolve 180 degrees in a counter clockwise direction. An ear 63 formed on the plate cooperates with a lug 64 projecting from the side frame to retain said rack in engagement with the gear 62.

Near the end of the upward travel of the plate 60, its end 65 engages an angle face 67 of a spring drawn arm 66, thereby putting its spring under tension. When the ear 63 passes above the lug 64 the spring arm will cause the plate 60 to swing to the right thereby disengaging the rack normally in mesh with the gear 62 from said gear and moving the opposite rack into mesh therewith, and as the key coupler 32 returns to its normal position, the plate will travel downward with the ear 63 to the right of the lug 64. As the ear passes beneath the lug 64, a spring 69, attached to the lower end of the plate 60, will return the plate to its normal position as shown in Fig. 9. The downward travel of the plate 60 completes the cycle of the shaft 56. The notched disc 70 which is fast to the shaft 56 cooperates with a spring controlled pawl 71 to prevent a retrograde motion of the shaft after it has rotated a certain distance, all of which is well known in the art.

The totalizer which is of the usual form is mounted on a pivoted frame 76, and comprises a plurality of rotatable elements 77, each appropriate to a numerical order and adapted when the totalizer frame is rocked rearwardly to engage with a registering segment 45. The totalizer frame is rocked at each operation of the machine by a cam 78 fast on the shaft 56 and cooperating rollers 79 carried on the bifurcated end of a lever 80 fast to the totalizer frame. Immediately upon starting the depression of a key 30 the totalizer is rocked into engagement with the registering segments 45 and remains in such position until after the printing operation has been completed, when it is disengaged to permit the transfer mechanism to operate. The transfer levers 81 are pivotally mounted in the totalizer frame and each carries a roller 82 at its rear end adapted to be engaged by a cam 83 fast to the driving shaft 56. The upper end of said transfer lever carries a pawl 84 which cooperates with a trip pawl 85 to carry from the totalizer wheel of lower order to the wheel of next higher order. A retaining pawl 86 prevents a retrograde motion of the totalizer wheels, all of which is fully described in the Carney Patent No. 497,860, previously referred to.

The items registered are indicated by means of vertical plates 90 (Figs. 1^A, 1^B and 8) fast to the upper ends of rods 91 guided in their movement by plates 92 and 93, the lower ends of the rods 91 resting upon the rear ends 94 of the item keys 30. As the item keys are depressed the indicators are elevated to a position in which the projections 95 are above the flange 96 formed on the rocking member 97. The rocking of said member is timed with the raising of the indicator so that as the projection 95 passes above the flange 96 the frame 97 is returned to normal position and retains the indicators in their elevated position until the next operation of the machine, all of which is well known in the art.

The right hand segment 45 (Figs. 1^A and 8) for the penny totalizer wheel also meshes with a pinion 101 fast near the left hand end of a shaft 102. The center segment 45 (Fig. 1^A) meshes with a gear 103 pinned to a rotatable rod 104. Fast near the right hand end of this rod is a companion gear 105 (Fig. 1^B) which meshes with a segment 106 engaging a pinion 107 fast to the left hand end of a telescopic sleeve 108. Another segment 109, which is pinned to the rotatable rod 44, meshes with a third pinion 110 fast to a telescopic sleeve 111. The shaft 102 and telescopic sleeves 108 and 111 extend to the right and on their right hand ends carry printing wheels 112 for printing the detail transactions on the record strip and also upon the issuing receipt strip which will hereinafter be described.

Figure 14:
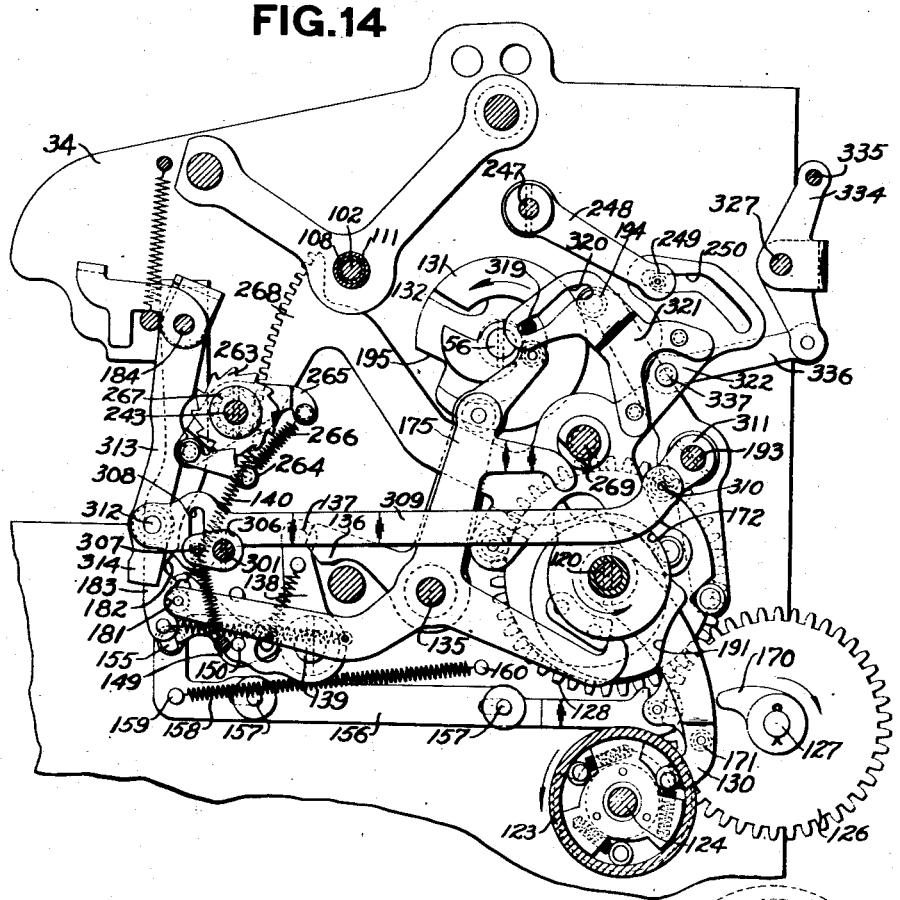
Fig. 14 is a sectional view taken on the line 14—14 of Fig. 1$^B$.
Figure 15:
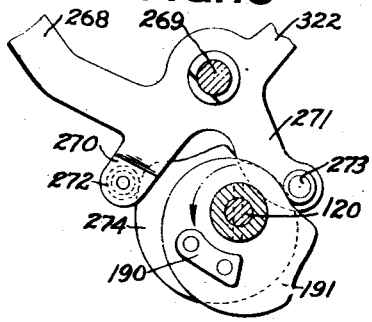
Fig. 15 is a detail view of the cams for operating the paper feed, ribbon feed, consecutive number, and printer aligner pawls.
Figure 16:
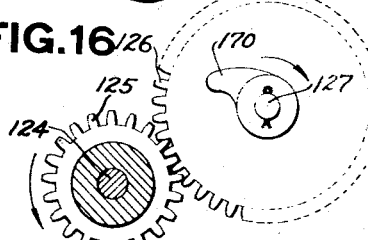
Fig. 16 is a detail view of the motor driving gear and intermediate gear.
Figure 18:
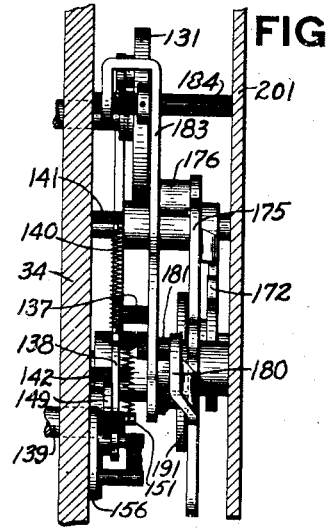
Fig. 18 is a front elevational view of the mechanism shown in Fig. 17.
Figure 19:
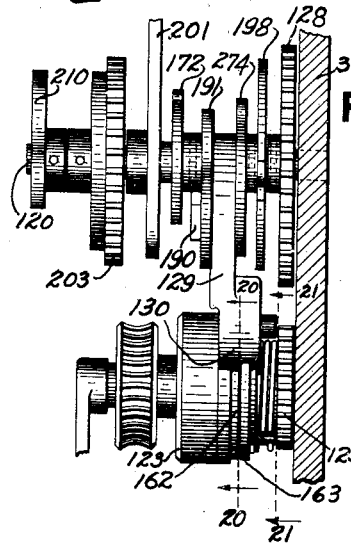
Fig. 19 is a rear elevational view of the motor clutch mechanism together with the printer driving shaft.
Figure 20:
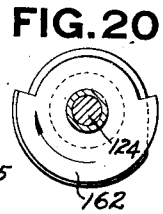
Fig. 20 is a detail sectional view taken on the line 20—20 of Fig. 19.
Figure 21:
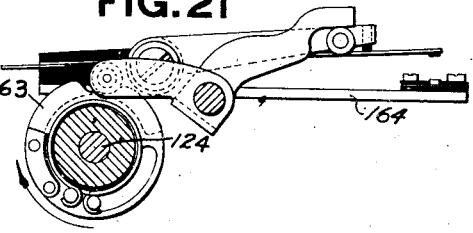
Fig. 21 is a detail sectional view showing the electric switch, taken on the line 21—21 of Fig. 19.

The printing mechanism is operated by a driving shaft 120 (Figs. 11 to 15, 17 and 19) which is rotated in a counter clockwise direction by an electric motor 122 or a manually operated crank 121 (Figs. 1$^B$ and 11) at each operation of the machine. The electric motor is mounted on the right hand side of the machine frame and directly under the printer. The motor drives the printing mechanism through a clutch device 123, which is well known in the art and is shown in Figs. 11, 14 and 19, for illustrative purposes only. Fast to the clutch shaft 124 (Figs. 14, 16 and 19) is a pinion 125 which meshes with an intermediate gear 126 freely mounted upon a stud 127 projecting from the side frame 34. The intermediate gear 126 also meshes with a gear 128 which is fast to the driving shaft 120. These gears make one complete revolution during each operation of the printing mechanism.

The printing mechanism is normally retained in an inoperative state by a swinging member 129 (Figs. 14, 17 and 19) which is freely mounted upon the driving shaft 120 and is formed at its lower end 130 to engage with various members of the driving clutch for opening and closing the circuit switch and stopping the printer driving shaft.

The starting of the motor is manually controlled by the depression of any one or more of the item keys. The depression of these keys to their downward position, which has previously been described, will rotate the main driving shaft 56, 180 degrees in a counter clockwise direction. Fast to the right hand end of this shaft is a disc 131 having a formed cam groove 132 and a stop shoulder 346 shown in normal position in Fig. 14, and in an operated position in Fig. 17. This last position is with a key depressed and the shaft rotated 180 degrees. Cooperating with the formed groove 132 is a roller 133 mounted on the upper end of arm 134 freely mounted on a rod 135, supported in the frame of the machine. A projection 136 on the arm 134 engages with a roller 137 mounted on a lever 138 pinned to a rockable rod 139. A tension spring 140 attached to the lever 138 and to a pin 141 projecting from the side frame, holds the roller 137 in engagement with the end 136 of arm 134. A pin 142 projecting from the frame 34 limits the movement of the lever 138 in a clockwise direction to prevent the spring 140 from forcing the roller 133 (Fig. 17) from the disc 131.

Fast to the rod 139 (Fig. 10) is an arm 146 carrying a pin 147 projecting into a slot 148 formed in an extension on the arm 35, previously described.

Figure 17:
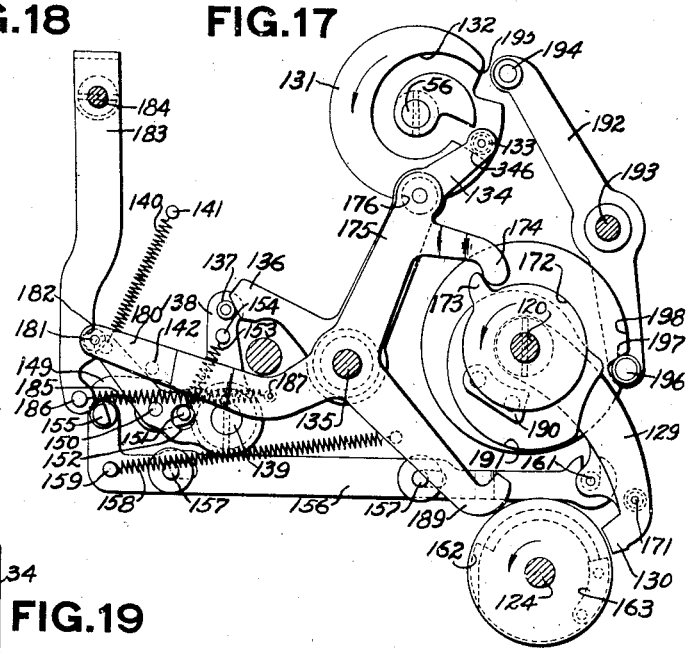
Fig. 17 is a detail view of the motor release mechanism when an item key is depressed and the electric motor released for operation.

From the foregoing description it will be seen that the depression of a key rotates the shaft 56 and cam disk 131 to rock the arm 134 in a clockwise direction into the position shown in Fig. 17, thereby moving the roller 133 into the path of the stop 346 and allowing the spring 140 to rock the rod 139 also in a clockwise direction and through the arm 146 (Fig. 10) to swing the arm 35 in a counter clockwise direction to a position under the key coupler 32 to retain it in such position until released by mechanism hereinafter described.

The lever 138 carries a spring actuated pawl 149 freely mounted on a stud 150 and provided with a pin 151 cooperating with an opening 152 in the lever 138 to limit the swinging movement thereof under the tension of a spring 153 attached to the pin 151 and to a pin 154 projecting from the lever 138 (Fig. 17). The pawl 149 normally engages with a pin 155 (Fig. 14) projecting laterally from the forward end of a bar 156 freely mounted for reciprocating movement upon studs 157 projecting from the side frame 34 through elongated slots in the bar. As the lever 138 is rocked in a clockwise direction at the time an item key is depressed, the pawl 149 will disengage from the pin 155, allowing the bar 156 to move toward the right, under the tension of a spring 158 attached to a pin 159 projecting from the bar 156 and to a pin 160 mounted in the frame 34. The right hand end of the bar 156 is slotted to engage with a pin 161 projecting from the swinging member 129 to swing said member in a counter clockwise direction as the bar moves to the right. This movement releases the clutch members 162 and 163 (Figs. 17, 19, 20 and 21), thereby closing the switch 164 to operate the electric motor which will give one revolution to the shaft 120 to operate the printing mechanism. The parts are proportioned to permit a complete release of the power means only after the key coupler supporting arm 35 has moved into supporting position.

As the motor and driving clutch are similar in construction to those shown in Letters Patent of the United States to C. F. Kettering and W. A. Chryst, No. 1,144,418, granted June 29, 1915, only a brief description is here given. Attached to the intermediate gear 126 (Figs. 14 and 16) is a cam plate 170 which, as it rotates during the operation of the printer driving mechanism, will, at the proper time, engage with a roller 171, carried on the lower end of the swinging lever 129, returning said lever to its normal position to open the switch 164 and stop the motor. The return of lever 129 to normal position moves the bar 156 forward to its normal position as shown in Fig. 14.

After the printing operation is completed the key coupler is permitted to return to its normal position, together with the item keys that were depressed. The mechanism for releasing the key coupler comprises a disc 172 (Figs. 14 and 17), fast to the drive shaft 120, and provided with a projection 173 adapted to engage a downwardly extending arm 174 of a pivoted member 175 fastened to the arm 134 by means of a stud 176. As the disc 172 is nearing the completion of its revolution in a counter clockwise direction, the projection 173 on the disk 172 will engage the arm 174 to cause the lever 134 to move in a counter clockwise direction, placing the roller 133 in the groove 132, and through the shaft 139 and arm 146, (Fig. 10) moving the supporting arm 35 in a clockwise direction, thereby permitting the key coupler and keys to return to normal and to rotate the shaft 56 to operate the transfer mechanism.

To retain the arm 134 (Fig. 17) in its operated position during the operation of the printing mechanism and in its normal position when returned thereto at the end of the printing operation, the member 175 is provided with a forwardly extending arm 180 carrying a laterally projecting pin 181 adapted to engage notches 182 formed in an arm 183 freely mounted on a rod 184. The arm 183 is held in engagement with the pin 181 by a spring 185 attached to a pin 186 mounted in the lower end of the arm 183 and a pin 187 mounted in the arm 180.

A hooked extension 189 on the member 175 (Figs. 14 and 17) normally lies in the path of a block 190 riveted to a disc 191 secured to the printer driving shaft 120 and serves as a positive stop for said shaft.

An interlocking device is provided for locking the main driving shaft 56, during the rotation of the printer driving shaft 120, and for locking the printer driving shaft except when the item key 30 is in its depressed position. This device consists of a lever 192 freely mounted on a shaft 193 mounted in the printer plate 201 and the frame 34. The upper end of said lever carries a roller 194 for locking engagement with a notch 195 in the disc 131 during printing operation and the lower end has a roller 196 for locking engagement with a notch 197 in a disc 198 fast on the shaft 120, during depression and return of item entering keys and while the keys are in normal position.

In addition to the electric motor means for operating the printing mechanism, a manually operated crank 121 is provided which is freely mounted upon a stud 200 projecting from the printer plate 201 and is connected to a pinion 202 by a standard clutch mechanism, well known in the art, but not shown here. The pinion 202 meshes with a gear 203 fast to the driving shaft 120 and as the pinion 202 is only half the size of the gear 203, it will make two revolutions in operating the printing mechanism.

Means is provided for equalizing the work of the operating crank 121 (Fig. 11) during a manual operation of the printing mechanism, to permit of a nearly uniform rotation being given to the driving shaft 120. This means comprises a spring 204 attached to a pin 205 projecting from the printer plate and to a pin 206 mounted in the lower end of an arm 207, freely mounted on the shaft 193. The arm is provided with a roller 208 mounted on a stud 209 and cooperating with a disc 210 fast to the driving shaft 120. The action of the spring 204, through the roller 208 upon the irregular formed disc 210, causes a retarding effect on the shaft 120 when the spring is being expanded by the disc, and an additional driving means for the shaft when the spring is allowed to contract.

A spring operated pawl 211 freely mounted on a screw stud 212 (Fig. 12) engages the teeth 213 of the gear 203 to prevent retrograde movement of the printer shaft.

Figures 1B, 2, 3, 4, 5, 6, 7:
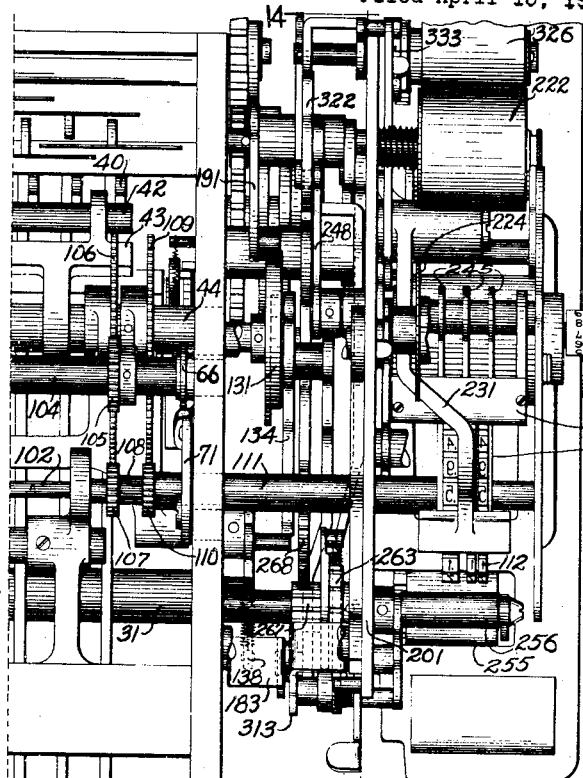
Fig. 2 shows a receipt issued by the machine.
Fig. 3 is a detail view of the under side of the date and consecutive number device.
Fig. 4 is a sectional view taken on the line 4—4 of Fig. 3.
Fig. 5 is a sectional view taken on the line 5—5 of Fig. 3.
Fig. 6 is a vertical transverse sectional view of the date and consecutive number device showing the means for positioning the printing wheels.
Fig. 7 shows a fragmentary portion of the detail strip.

Referring to Fig. 11, the printing wheels 112 print upon a record strip 220 (Figs. 7 and 11) and also upon an issuing receipt strip 221 (Figs. 2 and 11). Each wheel contains two sets of type characters alternately arranged, so that every other character prints from the bottom of the wheel and the intermediate characters from the top of the wheel.

The record strip 220 is run from a supply roll 222 around guide rolls 223 to a receiving roll 224 which is rotated in a counter clockwise direction at each operation of the machine by means of a spring controlled pawl 225 carried by an arm 226, and engaging a ratchet 227 fast to the receiving roll 224. The arm 226 receives an oscillating motion from a link 228 pivoted thereto and connected to the ribbon feeding mechanism hereinafter described. A spring controlled pawl 229, pivoted on a stud 230 and engaging with the ratchet 227, prevents a retrograde motion of the receiving roll 224. The record strip 220 passes between the printing wheel 112 and a platen 230.

The platen 230 is carried in a lever 231 pivoted on a stud 232 mounted in the printer plate 201. The lower extending portion of the lever 231 has a laterally projecting pin 233 which extends into a slot 234 in the upper end of a lever 235 fulcrumed on a stud 236 mounted in the printer plate 201. The lower end of the lever 235 carries a roller 237 which cooperates with a cam slot 238 in a gear 203 fast on the printer driving shaft (Fig. 13).

Fast to the printer wheels 112 (Figs. 1ᴮ and 11) are notched discs 244 with which cooperate spring cushioned pawls 245 mounted in a frame 246, fast on a rod 247, journalled in the printer frame. Also fast to the rod 247 (Fig. 14) is an arm 248 which has mounted in its lower end a roller 249 cooperating with a slot 250 in a segment lever 268 to oscillate the rod 247 at the proper time and bring the pawls 245 (Fig. 11) into engagement with the discs 244 to align the printer wheels at the time of taking an impression from the type characters.

The issuing strip or receipt 221 (Fig. 2), which is printed at each operation of the machine, if so desired, contains the name and address of the store, the consecutive number of the receipt, the date and the amount of the transaction. This issuing strip or receipt 221 is run from a supply roll (not shown) around a guide roll 251 (Fig. 11) and between a guard 252 and a plate 253 to a severing plate 254 and passes between a feed roller 255 mounted on a shaft 243, and a tension roller 256 freely mounted on a stud 257 carried by a lever 258 pivoted on the rod 184. This tension roller 256 is normally held in contact with the feed roller 255 by a spring 260. By means of a manually operated arm 261 freely mounted on the rod 184 and resting on a stud 262 projecting laterally from the lever 258, the tension roller 256 may be disengaged from the feed roller 255 when it is desired to adjust or insert a strip 221.

During each operation of the printer, and at the proper time, the strip 221 is fed forward by the rotation of the feed roller 255 in a counter clockwise direction. Attached to the shaft 243 on which the feed roller 255 is mounted is a ratchet 263 (Figs. 11 and 14), with which a pawl 264 pivoted on a lever 265 cooperates to rotate the feed roller. Said pawl is under the tension of a spring 266 connected to the same and the lever. Fast to the lever 265 is a gear 267 meshing with the segment lever 268 fulcrumed on a rod 269. This lever has two downwardly projecting members 270 and 271 (Fig. 15) carrying rollers 272 and 273 engaging formed discs 274 and 191 which are fast on the printer driving shaft 120 and, at each operation of the printer, will impart an oscillatory motion to the lever 268. A spring controlled pawl 275 (Fig. 11), pivoted on a stud 276, mounted in the printer frame 201, engages the ratchet 263 to prevent a retrograde motion of the feed roller 255.

The issuing receipt strip 221 passes beneath the printing wheels 112, electroplates 280 and 281, and the date and consecutive number wheels 282 and 283 (Figs. 6 and 11). At the proper time, and during the operation of the printing mechanism, a platen bearing member 284 will be raised, bringing platens 285, 286, 287 and 288 into contact with the issuing receipt strip. The platen bearing member 284 (Fig. 11) is pivotally mounted upon an arm 289, and guided in its movement by the operating crank stud 200, being bifurcated at its lower end 290 to cooperate with said stud. The arm 289 (Figs. 11 and 12) is freely mounted upon an eccentric collar 291 fast to the rod 193. A downwardly extending projection on the arm 289 carries a roller 292 cooperating with a groove 293 formed in the gear 203 to operate the platen bearing member each time the machine is operated.

The issuing of a receipt at every operation of the machine, or only at certain operations, is controlled by a manually operated device comprising a disc 300 (Fig. 11) mounted on a rod 301 rotatably supported by and extending through the printer plate 201. The two positions of this disc are known as the "on" position and the "off" position. The device is shown in the "on" position in which it will issue a receipt. By rotating said disc 180 degrees in a clockwise direction by means of the handle 302 the device will be changed to the "off" position in which no receipt will be issued. Cooperating with an eccentric slot 303 formed in the disc 300 is a pin 304 projecting from a vertically extending plate 305, which is guided at its lower end by the rod 301 and at its upper end by the shaft 243. By rotating the disc 300 in a clockwise direction the plate 305 will be moved upward into contact with the tension roller 256, raising said roller away from the feed roller 255 and removing the friction between the issuing receipt strip 221 and the feed roller so that the strip will not be moved forward to the issuing position but will be held between the tension roller and the plate 305.

The operation of the "on and off" disc also affects the functioning of the platen bearing member 284. Fast on the rod 301 (Figs. 11 and 14) is an arm 306 with a laterally projecting pin 307 extending into a vertical slot 308 formed in a link 309, the right hand end of which is pivoted on a stud 310 mounted in an arm 311 fast to the rod 193. As the rod 301 (Fig. 14) is rocked in a clockwise direction by moving the disc 300 to the "off" position, the link 309 will rock the rod 193 in a counter clockwise direction and through the eccentric 291 (Fig. 12) cause the arm 289 to move in a counter clockwise direction about the roller 292, lowering the platen bearing member a sufficient distance to prevent it from carrying the receipt strip into contact with the type as the printer driving shaft 120 is rotated. The left hand end of the link 309 (Fig. 14) is connected by a stud 312 to an arm 313 freely mounted on the rod 184. This arm is oscillated by the "on and off" device and locks the machine against operation, if the disc 300 is left in any position intermediate of the "on" or "off" positions. The lower end 314 of the arm 313 passes over the pin 181, and will, if left in an intermediate position, be in the path of said pin and prevent a clockwise movement of the lever 175, thereby locking the machine against operation. This interlocking mechanism will also prevent manipulation of the on and off disc during an operation of the keys 30, by the pin 181 (Fig. 14) being raised to a position in which the end 314 of the arm 313 would engage the pin, if the arm 313 were to be moved from either of its positions where it is placed by the on and off disc.

The date and consecutive number printing device, as shown for illustrative purposes in Figs. 3, 4, 5 and 6, is well known in the art and will be but briefly described here, it being described in detail in Letters Patent of the United States to W. Murphy, No. 541,247, granted June 18, 1895.

The cylinder 318 containing the date and consecutive number device is rigidly supported in the printer frame (Figs. 3, 6 and 11). A pin 319 projects from the consecutive number operating arm into a slot 320 formed in a plate 321 fast on the upwardly projecting member 322 of the segment lever 268 and is given an oscillating movement at each operation of the machine to add one unit at each operation. The date wheels 282 are operated in the usual way as fully described in the Murphy patent previously referred to.

To secure a visible impression on both the record strip and the issuing strip or receipt, a suitable continuous inking ribbon 323 (Fig. 11) is wound around guide rolls 324 and over an inking roller 326 mounted upon a stud 327 projecting from the printer plate. This ribbon is held taut by a tension roll 328 supported in a frame pivoted upon a rod 329 mounted in the printer frame. The ribbon is fed a short distance at each operation of the printer by a ratchet wheel 330 fast to the inking roller and a cooperating spring controlled pawl 331 pivoted on a stud 332 mounted in an arm 333. This arm is given an oscillatory motion at each operation of the machine by a lever 334 (Fig. 14) connected thereto by a pin 335, both the arm and lever being freely mounted on the stud 327.

The lever 334 is operated by a link 336 connected to a stud 337 mounted in the arm 322. A spring controlled pawl 338 (Fig. 11) pivoted on the guide roll stud 339 prevents retrograde motion of the inking roller 326.

While the form of mechanism herein shown and described is admirably adapted to fulfill the objects primarily stated it is to be understood that it is not intended to confine the invention to the one form of embodiment herein shown and described, as it is susceptible of embodiment in various forms all coming within the scope of the claims which follow.

What is claimed is:

1. In a machine of the class described, the combination of item entering means adapted upon actuation to set up recording elements in accordance with the amount entered, a platen, power means therefor, and means positively actuated by said item entering means for rendering the power means effective and for locking said item entering means.

2. In a machine of the class described, the combination of item entering means adapted upon actuation to set up recording elements in accordance with the amount entered, a shaft driven from said item entering means, a cam on said shaft, a platen, power means therefor, and means controlled by said cam for rendering said power means effective after the recording elements have been adjusted.

3. In a machine of the class described, the combination of item entering means adapted upon actuation to set up recording elements in accordance with the amount entered, a shaft driven from said item entering means, a cam on said shaft, a platen, power means therefor, and means controlled by said cam for rendering said power means effective and for locking said item entering means.

4. In a machine of the class described, the combination of item entering means adapted upon actuation to set up recording elements in accordance with the amount entered, a shaft driven from said item entering means, a shouldered cam on said shaft, a platen, power means therefor, means actuated by said cam and moved into alinement with its shoulder for locking said item entering means, and means controlled by the movement of said actuated means for rendering said power means effective.

5. In a machine of the class described, the combination of a plurality of item entering means adapted upon actuation to set up recording elements, a platen, power means therefor, a device actuated by the item entering means for arresting the movement of the same after the recording elements are set up, and means controlled by the movement of said device for rendering the power means effective.

6. In a machine of the class described, the combination of item entering means, recording elements and means for adjusting the same in accordance with the amounts entered, a platen, power means for actuating the platen, and means actuated by the item entering means for rendering the power means effective and for maintaining adjustment of the recording elements during operation of the power means.

7. In a machine of the class described, the combination of recording elements, a platen, item entering means adapted upon partial operation to adjust the recording elements in accordance with the items entered, and power means for operating the platen solely under control of the item entering means, said controlling means involving mechanism positively actuated by the same for arresting the same and for permitting the power means to become effective.

8. In a machine of the class described, the combination of a recording mechanism involving recording elements and a cooperating platen, item entering means adapted upon actuation to adjust said recording elements in accordance with the items entered and to restore said recording elements to normal, power means for actuating the platen, and means positively actuated by the item entering means during adjustment of the recording elements for stopping the item entering means after the recording elements have been adjusted, means under the control of said stopping means for rendering the power means effective, and means actuated by said power means for returning said stopping means to normal ineffective position to permit a restoration of the recording elements.

9. In a machine of the class described, the combination of item entering means, power means, means for arresting the item entering means, means controlled by the arresting means for holding the item entering means in arrested position, and means under control of the holding means for rendering the power means effective.

10. In a machine of the class described, the combination of item entering means, power means, means for holding the item entering means in an operated position, normally tending to move into operative position, means controlled by the holding means for rendering the power means effective, locking means for said holding means, and means actuated by the item entering means for disabling said locking means.

11. In a machine of the class described, depressible item entering means, means for holding the item entering means in a fully depressed position normally tending to move toward functioning position, and means under control of said item entering means for locking said holding means in an inoperative position while said item entering means is in its normal undepressed position.

12. In a machine of the class described, the combination of depressible item entering means, means for locking the item entering means in a fully depressed position, and means under control of the item entering means normally locking said locking means in an inoperative position.

13. In a machine of the class described, the combination of item entering means, means for holding the item entering means in an operated position, and positive means normally disabling said holding means, said disabling means being under control of the item entering means.

14. In a machine of the class described, the combination of a recording mechanism involving recording elements, means for feeding a record strip, item entering means, means controlled by the item entering means for adjusting the recording elements, adjustable means for disabling said feeding mechanism, and means controlled by said disabling means for locking said item entering means in their normal position when said disabling means is in an intermediate position.

15. In a machine of the class described, the combination of a recording mechanism involving recording elements, means for feeding a record strip, item entering means, means controlled by the item entering means for adjusting the recording elements, adjustable means for disabling said feeding mechanism, and means for preventing an adjustment of said disabling means during operation of the item entering means.

16. In a machine of the class described, the combination of a totalizer, actuators therefor, manipulative devices for driving said actuators to variable extents said manipulative devices being adapted to be given an actuating movement and a restoring movement, locking means for locking said manipulative devices at the end of their actuating movement, a power actuator under the control of said manipulative devices and rendered effective at the completion of the actuating movement of said devices and adapted to be given a single cycle of movement at each operation of the machine, connections intermediate the power actuator and said locking means for disabling the latter upon the completion of the cycle of movement of the power actuator to permit the restoring movement of the manipulative devices.

17. In a machine of the class described, the combination of item entering means, a shaft actuated thereby, a cam on said shaft, an operating mechanism involving a rotatable shaft, a shoulder carried by said rotatable shaft, and means normally in locking engagement with said shoulder and in operative engagement with said cam and adapted upon actuation of the item entering means to release said operating mechanism.

18. In a machine of the class described, the combination of item entering means normally operable through its initial movement and automatically movable through its final movement, a platen, a platen operating mechanism and power means therefor, means normally locking the platen operating mechanism and adapted to be released by the item entering means, means controlled by the item entering means for rendering the power means effective to move said locking means to release position with respect to the platen operating mechanism and into locking position with respect to the item entering means, means controlled by the platen operating mechanism for releasing the item entering means, and means under control of the item entering means for locking the platen operating mechanism during the final movement of the item entering means.

In testimony whereof I affix my signature.

EDWARD J. VON PEIN.

CERTIFICATE OF CORRECTION.

Patent No. 1,664,955.   Granted April 3, 1928, to

EDWARD J. VON PEIN.

It is hereby certified that error appears in the printed specification of the above numbered patent requiring correction as follows: Page 7, line 8, claim 7, strike out the word "same" first and second occurrence, and insert the words "item entering means" in both instances; and that the said Letters Patent should be read with these corrections therein that the same may conform to the record of the case in the Patent Office.

Signed and sealed this 1st day of May, A. D. 1928.

(Seal)

M. J. Moore,
Acting Commissioner of Patents.